United States Patent [19]

Muzychenko et al.

[11] 3,774,402
[45] Nov. 27, 1973

[54] HYDRAULIC SEAL FOR SALT WATER PONDS

[75] Inventors: Paul J. Muzychenko, Covina; George M. Mallan, La Verne, both of Calif.

[73] Assignee: Occidental Petroleum Corporation, Los Angeles, Calif.

[22] Filed: July 16, 1971

[21] Appl. No.: 163,329

[52] U.S. Cl. .................................. 61/1 R, 61/36 R
[51] Int. Cl. ........................... E02b 3/00, E02d 3/00
[58] Field of Search ................. 47/DIG. 10; 61/1 R, 61/7, 36 R; 166/292

[56] References Cited
UNITED STATES PATENTS

| | | | |
|---|---|---|---|
| 3,379,014 | 4/1968 | Phillips et al. | 61/1 |
| 3,359,738 | 12/1967 | Dybalski et al. | 61/1 |
| 3,075,851 | 1/1963 | Hemwall | 61/36 X |
| 3,415,022 | 12/1968 | Schaefer et al. | 61/1 X |

*Primary Examiner*—Mervin Stein
*Assistant Examiner*—David H. Corbin
*Attorney*—Robert L. Parker et al. and Richard D. Seibel

[57] ABSTRACT

A technique is provided for reducing hydraulic leakage from earthen solar brine concentration ponds by application of a layer of phosphate slimes in an amount in the range of from about 1 to 3 pounds per square foot to the bottom of the pond for reducing permeability of the earth. Preferably the phosphate slimes are applied by pumping in a thin slurry of phosphate slimes which are then permitted to settle. A portion of the slimes may be mixed with underlying earth, if desired. Preferably a permanent layer of precipitated salts is built up over the layer of phosphate slimes.

5 Claims, 3 Drawing Figures

Patented Nov. 27, 1973 3,774,402

INVENTORS
PAUL J. MUZYCHENKO
BY GEORGE M. MALLAN

Christie, Parker & Hale
ATTORNEYS

HYDRAULIC SEAL FOR SALT WATER PONDS

BACKGROUND OF THE INVENTION

Hydraulic leakage from ponds and reservoirs may be a substantial factor in the cost of maintaining and operating the pond. By hydraulic leakage, it is meant seepage through the reservoir bottom due to the permeability of the earth forming the reservoir. In high permeability soils the quantity of water that may leak from the reservoir may be very high and, therefore, means are often provided for sealing the bottoms of the reservoirs for reducing the permeation of water through the soil.

Hydraulic leakage is particularly important in solar evaporation processes where valuable brines are concentrated for long periods of time. According to such processes, relatively low concentration brines are pumped into large, shallow, earthen ponds where solar heating induces evaporation of the water, thereby concentrating the brine to a sufficient extent that economical recovery of valuable materials from the brines can be achieved. In some cases the brines are merely concentrated and processed directly from the liquid, and in other processes, the brines are concentrated to the point that substantial amounts of salts are precipitated in the bottoms of the ponds. Thereafter, mechanical salt harvesting equipment recovers the solid salts. As solar evaporation proceeds, the brine in the ponds becomes more concentrated and any hydraulic leakage that occurs substantially reduces the yield of valuable materials from the brine.

The least expensive solar concentration ponds are those that can be built upon impermeable natural clay where additional sealants are not required. Unfortunately, such clays are not usually avaialbe in the more favorable evaporative locations where ponds woud be desirable, and it is often necessary to build the ponds on earth that has a high permeability and additional measures must be taken for sealing the bottom of the pond in order to prevent excessive hydraulic leakage.

In most solar pond operations where dilute brines are concentrated for eventual deposition or receovery of dissolved salts, acceptable hydraulic leakage rates range from about 0.01 inches per day to about 0.3 inches per day. That is, in addition to evaporation decreases, the water level in the pond may decrease about 0.01 to 0.3 inches per day due to seepage of water, including disolved salts, through the bottom and walls of the pond. When it is necessary to build solar ponds on soil that is more porous than low permeability natural clays, additional means must be used for sealing the bottom of the ponds in order to reduce hydraulic leakage to acceptable limits.

The most effective sealing for a solar pond is to use rubber or plastic membranes over the entire bottom of the pond before it is filled. SUch membranes in place in a reservoir may cost from about 12 to 30 cents per sqaure foot ($5,200 to $13,000 per acre). These high costs often preclude the use of such expensive materials. Considerably less expensive membranes have been made from polyvinyl chloride, polyethylene and the like, and the cost of applying such membranes runs from about 3 to 8 cents per square foot. Unfortunately, the service life of membranes, particularly the latter ones, is relatively short, and it is usually required that the membranes be replaced in about 3 to 8 years. This is particularly true if used in salt concentration ponds where mechanical salt harvesting equipment is employed.

Some chemical sealants have been applied in test applications, but the results have not been entirely satisfactory because the materials alone may be in excess of about $.025 per square foot and the cost of application must be added to that.

The lowest cost techniques known for reducing leakage in a porous pond system is to bring natural bentonite clay to the site and apply it to the bottom of the pond in one of several manners. One of the more effective ways is to apply the clay as a water slurry, allowing the solids to settle out to form a relatively impermeable layer on the pond bottom. This is not always desirable since it is necessary to form the water slurry from solid clay lumps. Another technique is to apply the dry clay to the soil followed by tilling the soil and clay together to a depth of about one foot.

Bentonite clay typically costs about $35 per ton delivered to a brine concentration site. The cost of applying must be added to this, either by spreading the dry material, followed by tilling, or preparation of a suitable slurry to be deposited on the pond bottom. The usual total cost for applying a bentonite clay sealant to a pond is in the order of about $1,000 to $1,500 per acre, or about 2.3 to 3.7 cents per square foot.

As in all large scale industrial processes, it is highly desirable to reduce the cost and increase the effectiveness of operations. It is, therefore, desirable to provide a better brine pond hydraulic sealant at lower cost than has been previously available.

BRIEF SUMMARY OF THE INVENTION

Therefore, in practice of this invention according to a presently preferred embodiment a technique is provided for reducing hydraulic leakage from earthen brine concentration ponds by applying a layer of phosphate slimes to the bottom of the pond for reducing permeability of the earth. Preferably, the phosphate slimes are applied in the range of from about one to three pounds per square foot by settling of solids from a slurry thereof.

DRAWINGS

These and other features and advantages of the invention will be appreciated as the same becomes better understood by reference to the following detailed description of a presently preferred embodiment when considered in connection with the accompanying drawings wherein.

DESCRIPTION OF PHOSPHATE SLIMES

Figure 1:
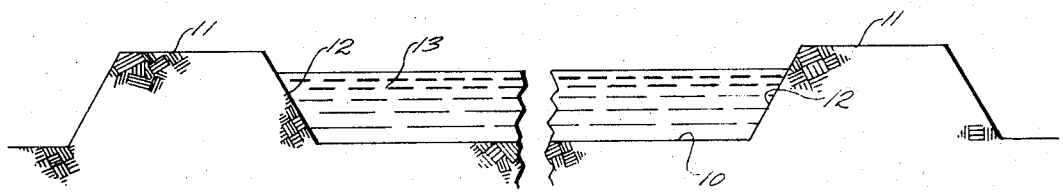
FIG. 1 illustrates in cross section a brine concentration pond constructed according to principles of this invention, and having a slurry of phosphate slimes therein.

Phosphate slimes are produced as a by-product of the beneficiation of phosphate rock prior to the manufacture of phosphoric acid or other phosphate products. In the mining of phosphate rock, the overburden of gangue is first removed and the crude ore is mined. This crude phosphate matrix is typically composed of about one-third recoverable phosphate rock in the form of pebbles or boulders, about one-third sand tailings, and about one-third of material less than about 150 mesh particle size. This mixture of rocks, sand and clay is conveyed from the mining site to a washing plant where it undergoes a number of operations for cleaning and recovering the phosphate rock therefrom. Hammer mills are used for breaking up the matrix so that the coarsest particles are about three-fourths inch. At this stage, a clean coarse phosphate rock is seaprated in a size ranging from about 16 mesh to three-fourth inch. The material under about 16 mesh which contains fine clay, phosphate rock, and silica is then subjected to desliming princiaplly in hydraulic cyclones and hydroseparators that make a separation at about 150 to 200 mesh. The underflow, which comprises relatively larger sand and phosphate rock, is further concentrated by flotation for recovering valuable phosphate rock. The balance is a sufficiently coarse sand to be usable. The overflow from the separation comprises a slurry of slimes which typically is transferred to slime settling ponds.

As mentioned hereinabove, slimes typically constitute about one-third of the total weight of crude ore mined, and since recovery of phosphate rock is a substantial industry, many millions of tons of such slimes are produced annually. Such slimes are typically pumped to deep settling ponds where the solids in the slurry are permitted to settle. Phosphate slimes are, however, a very unusual material since even after years of settling a state of equilibrium is reached wherein the slimes have a concentration of only about 25 percent solids, and about 75 percent contained water. Because of the large water content, the volume required for storage of slimes is about 1 ¼ to 1 ⅓ times the volume of original ore mined. Thus, after mining operations are completed in an area, slimes from a subsequently mined area may be stored in the excavation; however, to provide sufficient volume, dikes are built around the mined area so that the settling ponds are substantially above the original ground level. The cost of constructing and maintaining the dikes is substantial, and there is a continuing threat of rupture of the dikes with pollution of the surrounding area by the phosphate slimes.

The mineral composition of the phosphate slimes varies somewhat because the original matrix is from different areas and chemical composition likewise varies. Typical approximate mineral composition of Florida phosphate slimes is set forth in the following table in terms of percent by weight.

| Mineral | Percent |
|---|---|
| Carbonate fluorapatite | 20-25 |
| Quartz | 30-35 |
| Montmorillonite | 20-25 |
| Attapulgite | 5-10 |
| Wavellite | 4-6 |
| Feldspar | 2-3 |
| Heavy minerals | 2-3 |
| Dolomite | 1-2 |
| Miscellaneous | 0-1 |

It is to be understood that the table is not intended as comprehensive of all variations that may occur in phosphate slimes, since the relative proportions of various materials may differ substantially from this typical composition in many mining areas. The slimes are uniformly substantially different from most naturally occurring clays in that they are quite high in phosphate concentration, typically, for example, in the range of from about 9 to 20 percent phosphrus, expressed as $P_2O_5$. They are also significantly higher than usual in silica content. They also differ substantially in the very low amount of settling that occurs even after long periods of time.

DESCRIPTION OF THE INVENTION

In practice of this invention according to a presently preferred embodiment phosphate slimes are applied as a layer in the bottom of earthen brine concentration ponds for reducing the permeability of the earth. As mentioned hereinabove, phosphate slimes are available as a slurry having from 10 to about 25 percent solids, and since the slimes typically present a substantial disposal problem they are available at the mining site at substantially no cost. The phosphate rock producers are happy to be rid of a substantially useless and troublesome by-product. The slurry is pumpable and, therefore, readily transported. Many phosphate rock operations are sufficiently near ocean transportation that ships can be used for transit, which is particularly economical since many brine concentration facilities are also located near the ocean. The phosphate slimes are already in the form of a slurry, which can be diluted as desired for economical application to brine concentration ponds and it is not necessary to make a slurry from dry material.

Unexpectedly, it has also been discovered that phosphate slimes provide a substantial improvement over sealing brine ponds with bentonite clay. The rate of hydraulic leakage of brine is reduced to one-third to one-half of the leakage through soil sealed with bentonite clay, and such sealing is effected at less cost.

Figure 2:
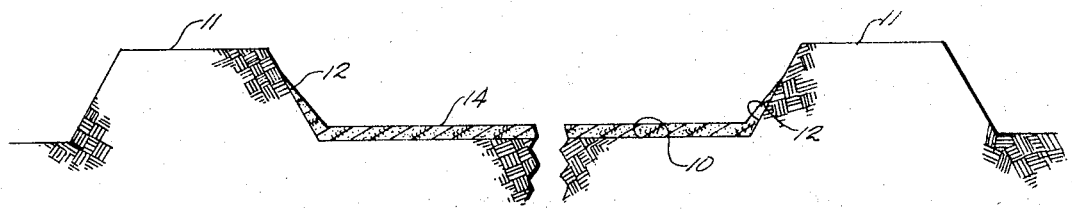
FIG. 2 is a cross section of a pond with settled phosphate slimes.
Figure 3:
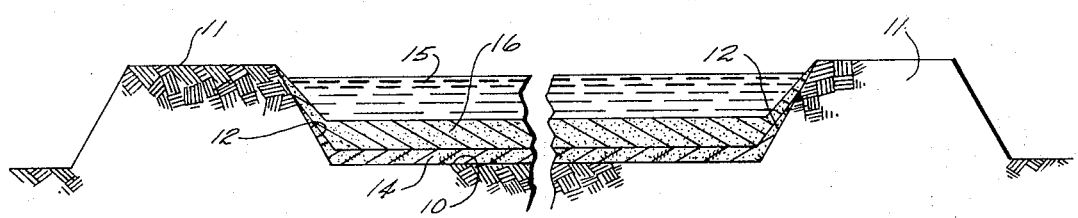
FIG. 3 illustrates a typical operating pond sealed according to prinicples of this invention.

FIGS. 1 through 3 illustrate schematically in cross section a salt concentration pond constructed according to principles of this invention. As illustrated in this embodiment, the pond comprises a large area having a flat bottom 10 which may comprise many acres. Surrounding the pond bottom are dikes 11, preferably principally formed by piling earth to a sufficient width and height to form walls 12 of the pond that have very low water leakage rates. As illustrated in FIG. 1, a water slurry 13 of phosphate slimes is pumped into the pond in a sufficient depth to have a solid content in the range of from about 1 to 3 pounds per square foot of pond area.

It is preferred that the phosphate slimes be used with a solids content in excess of about one pound per square foot since a layer less thick than this seldom seals with sufficient effectiveness to be worth the cost of application. Little reason is seen for increasing the layer above about 3 pounds per square foot since the hydraulic leakage is not significantly decreased beyond this value and there is merely increased cost for transporting the phosphate slimes to the pond site.

Typically the phosphate slimes are transported to the brine concentration site in the form of a slurry having in the order of about 20 percent solids by weight. These slimes are diluted with water to about 10 percent solids by weight, and are pumped into the concentration pond. the excess water in the slimes principally percolates into the soil forming the concentration pond carrying a portion of the slimes into the surrounding soil to form a dense, substantially impervious layer 14 as seen in FIG. 2. A portion of the water may evaporate from the slimes. This leaves a pond, the bottom 10 and a portion of the walls 12 of which are coated with a layer 14 of phosphate slimes, at least a portion of which may be comingled with a portion of the underlying soil.

It is important to keep the layer of phosphate slimes from completely drying in the bottom of the pond insofar as the layer is continuous. SUch drying of the slimes layer can lead to drying cracks because of the substantial reduction in volume during drying. Such cracks can increase the rate of hydraulic leakage from the pond and reduce the effectiveness of the sealant coating.

After the slurry of phosphate slimes has settled and at least partly percolated into the soil forming the brine concentration pond, salt containing brine 15 is pumped in and solar evaporation permitted to occur over a sufficient time for building up the layer of solidified salts 16 in the bottom of the pond as seen in FIG. 3. This layer of salt is important for proper operation of a solar pond, and provides mechanical protection for the sealant forming the bottom of the pond. In the case of a pond sealed with phosphate slimes, the salt layer 16 which forms may press on the slimes layer 14 for additional dewatering and sealing of the pond bottom. Typically, the total phosphate slimes layer on the bottom of the pond might be 6 inches thick, a portion of which would be percolated into the substrate soil. A solidified layer of salts about 1 foot thick might be present, and an additional 18 inches of brime undergoing concentration would overlie the bed of solid salt. The thickness of salt and brine will, of course, vary as operation of the brine concentration pond proceeds. It will also be understood that these thicknesses are exemplary and substantial differences may be encountered in different operations.

It should be understood that the brines and salts referred to hereinabove are not necessarily limited to seawater and the like since many other brines have valuable salts that are recoverable from solar evaporation ponds. Thus, in various regions soldium, potassium, magnesium, boron, halides, sulphates, and the like, may be encountered in economically valuable proportions in naturally occurring or artificial brines.

A direct comparison of sand sealed with phosphate slimes and sealed with bentonite clay shows substantially similar performance when fresh water overlies the sealant layer. When the same quantity of sealant is applied in terms of the equivalent thickness of a dry layer, the phosphate slimes and and bentonite are approximately equivalent in hydraulic leakage rate, with the leakage rate being slightly less for bentonite than for the phosphate slimes. Because of the low cost of phosphate slimes, a thicker layer can economically be applied, and sealing of fresh water ponds with phosphate slimes can be economical.

It is in brine concentration ponds where the water in the pond is saturated or of high concentration brine that sealing with phosphate slimes is particularly advantageous. This occurs not only because of the economical nature of sealing with the phosphate slimes but also because the rate of hydraulic leakage is only about one-third to one-half of the leakage through soil sealed with bentonite clay. Thus, in one series of tests in laboratory conditions where surface evaporation did not confuse the results, saturated sodium chloride solutions were passed through sand beds sealed with bentonite clay and phosphate slimes, respectively. Equal dry weights of slimes and bentonite clay were used, and applied by settling from slurries having 10 percent by weight solids. Under a constant hydraulic head the rate of hydraulic leakage through beds sealed with phosphate slimes was from 32.7 to 38.3 percent of the rate of hydraulic leakage through a bed sealed with bentonite clay. Comparable results are obtained in large scale brine concentration ponds.

The phosphate slimes can also be added to a brine concentration pond by transporting dry slimes from tthe mining site to the site of the brine concentration ponds, followed by spreading of the dried slimes onto the surface and tilling to comingle the slimes with the topmost layers of soil. Such application can be supplemented with a layer of phosphate slimes applied as a slurry if desired.

Although limited embodiments of technique for sealing a brine concentration pond or similar reservoir by application of phosphate slimes thereto have been described and illustrated in this application, many modifications and variations will be apparent to one skilled in the art. It is, therefore, to be understood that within the scope of the appended claims the invention may be practiced otherwise than as specifically described.

What is claimed is:

1. A method of reducing hydraulic leakage from an earthen solar brine concentration pond comprising the step of applying a slurry of phosphate slimes to the bottom of the pond and allowing the water in the slurry to evaporate and percolate into the soil to form a dense, substantially impervious layer of phosphate slimes for reducing permeability of the earth.

2. A method as defined in claim 1 wherein the setp of applying comprises applying a slurry of phosphate slimes in an amount in the range of from about one to three pounds of dry weight of slimes per square foot of pond surface.

3. A method as defined in claim 2 wherein the step of applying comprises pumping a slurry of phosphate slimes in water into the pond and settling the solids from the slurry to build up a layer, at least a portion of which is infiltrated into the surrounding earth.

4. A method as defined in claim 2 further comprising the step of building up a layer of solid salts over the layer of phosphate slimes.

5. A method as defined in claim 1 wherein the step of applying includes mixing the slurry of phosphate slimes with a portion of earth on the bottom of the pond.

* * * * *